(12) United States Patent
Gruetzmacher et al.

(10) Patent No.: US 7,172,067 B2
(45) Date of Patent: Feb. 6, 2007

(54) LEVEL CASE WITH POSITIONING INDENTATIONS

(75) Inventors: Richard J. Gruetzmacher, Colgate, WI (US); Michael L. Grinnall, Clinton, IA (US); Duane D. Franzen, Jr., Albany, IL (US)

(73) Assignee: Johnson Level & Tool Mfg. Co., Inc., Mequon, WI (US)

( * ) Notice: Subject to any disclaimer, the term of this patent is extended or adjusted under 35 U.S.C. 154(b) by 265 days.

(21) Appl. No.: 10/705,054

(22) Filed: Nov. 10, 2003

(65) Prior Publication Data

US 2005/0098458 A1    May 12, 2005

(51) Int. Cl.
*A45C 11/26* (2006.01)
*B65D 85/30* (2006.01)

(52) U.S. Cl. .................. 206/349; 206/583; 206/586

(58) Field of Classification Search ............... 206/349, 206/446, 521, 583, 586, 588, 590–591; D3/269, D3/300

See application file for complete search history.

(56) References Cited

U.S. PATENT DOCUMENTS

| | | | | |
|---|---|---|---|---|
| 1,883,450 A | * | 10/1932 | Andrews | 206/583 |
| 2,553,418 A | * | 5/1951 | Loth | 206/521 |
| 3,044,161 A | * | 7/1962 | Morrison | 206/583 |
| 3,055,495 A | * | 9/1962 | Naimer | 206/583 |
| 3,280,969 A | * | 10/1966 | Evans et al. | 206/349 |
| 4,159,764 A | * | 7/1979 | Schinke | 206/583 |
| D293,044 S | * | 12/1987 | Johnson | D3/300 |
| D322,716 S | * | 12/1991 | Morris et al. | D3/300 |
| 5,119,936 A | | 6/1992 | Sevey | |
| 5,205,111 A | | 4/1993 | Johnson | |
| 5,263,584 A | | 11/1993 | Sevey | |
| 5,312,008 A | | 5/1994 | Davis | |
| 5,363,957 A | | 11/1994 | Reichner | |
| D353,486 S | | 12/1994 | King | |
| 5,372,250 A | | 12/1994 | Johnson | |
| 5,515,971 A | | 5/1996 | Segrest | |
| 5,640,795 A | | 6/1997 | Wambolt | |
| 5,662,220 A | | 9/1997 | Schurman | |
| 5,680,949 A | | 10/1997 | Roesler | |
| 5,829,591 A | | 11/1998 | Lyons | |
| 5,850,916 A | | 12/1998 | Pettersson et al. | |
| 6,068,119 A | | 5/2000 | Derr et al. | |
| 6,450,333 B1 | | 9/2002 | McClenahan et al. | |
| 6,477,781 B1 | | 11/2002 | Blatt | |
| D505,260 S | * | 5/2005 | Gruetzmacher | D3/300 |

* cited by examiner

*Primary Examiner*—Bryon P. Gehman
(74) *Attorney, Agent, or Firm*—Boyle Fredrickson Newholm Stein & Gratz, S.C.

(57) ABSTRACT

A level case includes a tubular body having a series of walls that define an internal cavity, and a cap that selectively closes the internal cavity. A series of indentations are formed in the walls, and are configured to receive and engage the corners of a level received within the internal cavity. The internal cavity defines spaces between the level surfaces and the facing surfaces of the walls, to protect the level surfaces in the event the walls of the tubular body are subjected to forces that cause inward deformation of the walls. The cap is configured similarly to the tubular body, including indentations that receive the corners of the level. The cap is engaged over the opening of the tubular body so as to enclose a portion of the level that extends outwardly of the tubular body. The indentations in the tubular body are continuous throughout a majority of the length of the tubular body.

17 Claims, 2 Drawing Sheets

LEVEL CASE WITH POSITIONING INDENTATIONS

BACKGROUND AND SUMMARY OF THE INVENTION

This invention relates to a case for an elongated tool such as a level, and more particularly to a level case that protects the level during transport and handling.

Prior art level cases are shown in U.S. Pat. Nos. 5,119,936 and D293,444. The '444 patent discloses a tubular case having an open end which receives the level, and which is closed by a cap to maintain the level in the case. The '936 patent also discloses a case that is generally tubular in shape, but includes circumferential indentations at intermittent locations along the length of the case. The indentations maintain the level out of contact with the walls of the case. With this construction, the walls are spaced outwardly from the surfaces of the level in the areas between the indentations, to protect the level. However, each circumferential indentation presents an area at which the level surfaces are close to the walls of the case, which creates the potential for damage to the level in the event the case is subjected to an isolated force, which can occur when the case is dropped or struck by an object.

It is an object of the present invention to provide a level case which does not include circumferential areas that surround the level, thus eliminating the potential for damage to the level when the level case is subjected to an isolated force along the length of the level case. It is a further object of the invention to provide such a level case which maintains the surfaces of the level in a location spaced from the walls of the case, throughout the length of the case. It is another object of the invention to provide such a level case which is constructed so as to minimize the potential for the level surfaces to be subjected to forces experienced by the walls of the case. Yet another object of the invention is to provide such a level case which positively engages the level to maintain the level in position within the case, while providing protection for the level throughout its length.

In accordance with one aspect of the present invention, a case for a level, which includes one or more level vials, is in the form of a tubular body defining an interior or internal cavity configured to receive the level. The tubular body defines an open end through which the level is inserted into the internal cavity. A cap is configured for engagement with the level case so as to selectively enclose the open end, to maintain the level within the internal cavity of the body. The level has a cross section that defines a series of corners, and the level case includes at least a pair of circumferentially opposite, axially extending indentations that are configured to receive and engage at least a pair of oppositely disposed corners of the level. The indentations extend inwardly from the walls of the tubular body, and both the walls of the tubular body and the indentations are preferably formed so as to be continuous throughout a majority of the length of the tubular body. For a level having a rectangular cross section, or other cross section defining four corners, the level case preferably includes four axial indentations that are spaced about the periphery of the body and configured to receive and engage the four corners of the level. With this construction, the walls of the tubular body, which are located between the indentations, are spaced outwardly from the surfaces of the level. The indentations maintain the surfaces of the level at a location inwardly of the walls of the tubular body throughout the length of the level, to eliminate the presence of any areas on the case that are in close proximity to the level surfaces at a single location along the length of the tubular body. The space between the level surfaces and the walls of the tubular body thus provides a cushion to protect the level surfaces.

The cap is removably engaged with the tubular body at the open end, to selectively close the open end and to maintain the level within the internal cavity of the tubular body. In a preferred construction, the tubular body has a length less than that of the level, such that a portion of the level extends outwardly from the open end of the tubular body when the level is received within the internal cavity of the tubular body. The cap also defines an internal cavity within which the outwardly extending portion of the level is received when the cap is engaged with the end of the tubular body. The cap also preferably includes indentations for receiving and engaging the corners of the level, and walls that are spaced outwardly from the surfaces of the level throughout the length of the cap.

The invention contemplates a level case as summarized above, as well as an improvement in a level case and a method of encasing a level, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figures 1, 2:
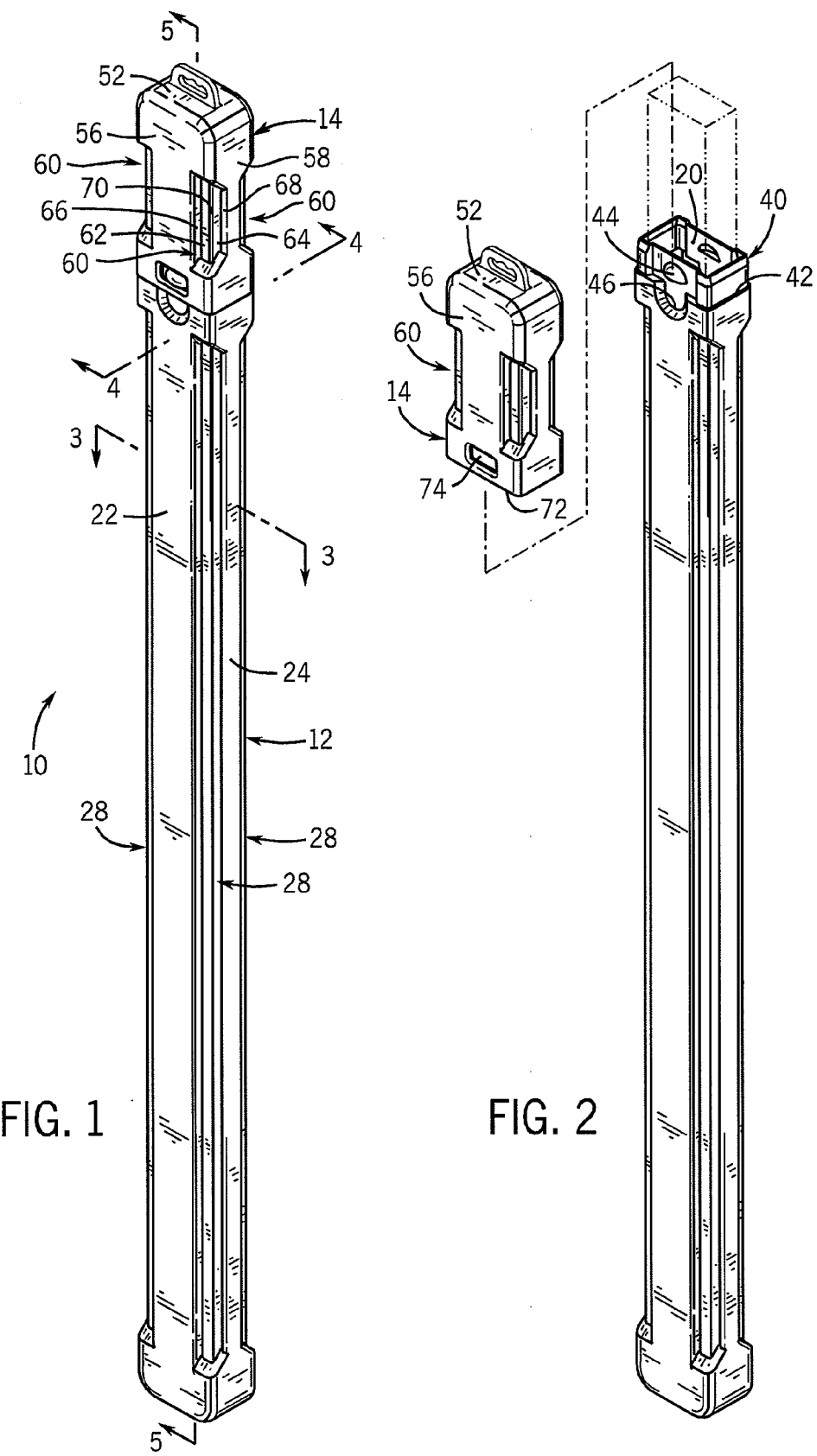
FIG. 1 is an isometric view of a level case constructed in accordance with the present invention, showing the tubular body of the level case and the cap engaged with the open end of the tubular body to enclose the internal cavity.
FIG. 2 is a view similar to FIG. 1, showing the cap disengaged from the open end of the tubular body.
Figure 3:
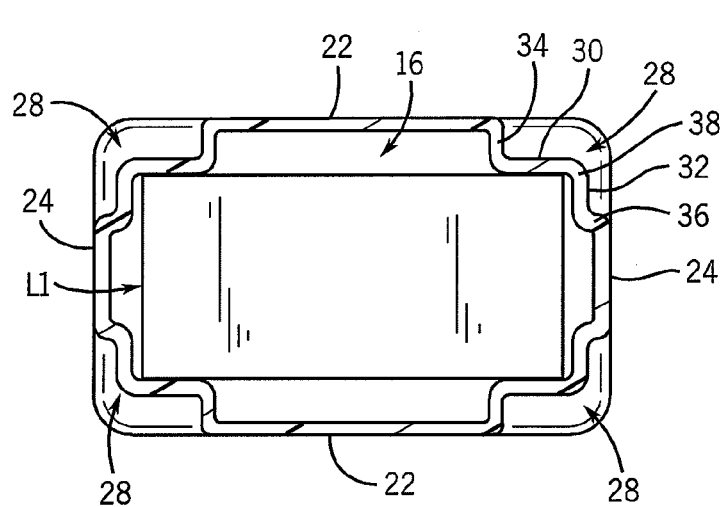
FIG. 3 is a section view taken along line 3—3 of FIG. 1, showing engagement of the indentations of the tubular body with the corners of a level having a rectangular cross section.

FIG. 1 generally illustrates a level case 10 constructed in accordance with the present invention, which is intended to store a level such as L1 (FIG. 3) or L2 (FIG. 4) when the level is not in use. Level case 10 includes a tubular body 12 and a cap 14.

Tubular body 12 defines an interior or internal cavity 16, which is closed at one end by an end wall 18 and which defines an opening 20, opposite end wall 18, that provides access to internal cavity 16. Tubular body 12 includes a series of elongated walls that cooperate to define internal cavity 16. The elongated walls of tubular body 12 comprise a pair of spaced apart, parallel side walls 22 and a pair of spaced apart, parallel side walls 24, which cooperate with end wall 18 to define internal cavity 16. Throughout the majority of the length of tubular body 12, the corners of tubular body 12 are defined by a series of indentations 28 which are located between and interconnect side walls 22 and 24.

Each indentation 28 is formed so as to define a first wall 30 that is offset inwardly from side wall 22, and a second wall 32 that is offset inwardly from side wall 24. A spacer wall 34 extends between side wall 22 and its associated first wall 30, and a spacer wall 36 extends between side wall 24 and its associated second wall 32. A corner 38 is located between first wall 30 and second wall 32 of each indentation 28. In the illustrated embodiment, corner 38 defines an included angle of 90°, such that first wall 30 and second wall 32 are generally perpendicular to each other.

Indentations 28 are formed so as to extend continuously throughout the majority of the length of tubular body 12. It is also contemplated, however, that indentations such as 28 may be discontinuous, i.e. formed at intermittent locations along the length of tubular body 12. Each indentation 28 terminates inwardly of end wall 18 and inwardly of opening 20, so that side walls 22 and 24 of tubular body 12 cooperate to form end sections that have a generally rectangular cross section.

Tubular body 12 includes a connector section 40 that defines opening 20. Connector section 40 has walls that are spaced slightly inwardly from side walls 22 and 24, to form a peripheral shoulder 42. A pair of opposed side walls of connector section 40 are formed with outward ramped protrusions 44. Connector section 40 further includes a pair of recesses 46, each of which is located adjacent one of protrusions 44.

Cap 14 is formed similarly to tubular body 12, defining an internal cavity 50 which is closed at one end by an end wall 52, and which is accessible through an opening 54 located opposite end wall 52. Cap 14 further includes a pair of side walls 56 and a pair of side walls 58. Indentations 60 are formed in a central area of cap 14, and extend continuously between end sections defined by cap 14. Again, however, it is contemplated that indentations such as 60 may be discontinuous, i.e. formed at intermittent locations along the length of cap 14. Each indentation 60 includes a first wall 62 spaced inwardly from side wall 56, and a second wall 64 spaced inwardly from a side wall 58. A spacer wall 66 is located between side wall 56 and its associated first wall 62, and a spacer wall 68 is located between each side wall 58 and its associated second wall 64. A corner 70 is located between first wall 62 and second wall 64 of each indentation 60, and defines an included angle of 90° so that first and second walls 62, 64, respectively, are perpendicular to each other. Each indentation 60 terminates inwardly of cap end wall 52 and cap opening 54, so that side walls 56 and 58 of cap 14 cooperate to form end sections that have a generally rectangular cross section.

Cap side walls 56 and 58 terminate in a peripheral edge 72 located opposite end wall 52. An opening 74 is formed in each side wall 56, located inwardly of and adjacent edge 72.

In operation, a level such as L1 is contained within level case 10 by first inserting one end of level L1 through opening 20 of tubular body 12, and sliding level L1 inwardly into internal cavity 16 of tubular body 12 so that the end of level L1 engages end wall 18. Tubular body 12 has a length less than that of level L1, so that the opposite end of level L1 extends outwardly of opening 20. When level L1 is received within tubular body 12 in this manner, each corner of level L1 is received within and supported by one of indentations 28. The spacing between opposite first walls 30 of indentations 28 is selected so as to be slightly greater than the thickness of level L1. Similarly, the spacing between facing second walls 32 of indentations 28 is selected so as to be slightly greater than the height of level L1. With this construction, indentations 28 cooperate to support level L1 inwardly of side walls 22 and 24. The area of internal cavity 16 that is located between each side wall 22, 24 and the facing surface of level L1 functions to form an air space, which protects the surfaces of level L1 against any forces that may be experienced by side walls 22 or 24 and that may cause inward deformation of side walls 22 or 24. The thickness of level L1 is such that the outwardly facing surfaces of level L1 are located closely adjacent the inside surfaces of indentation first walls 30, and a slight amount of clearance is defined between the top and bottom surfaces of level L1 and the facing inside surfaces of indentation second walls 32.

Cap 14 is then engaged with tubular body 12 over the portion of level L1 that extends outwardly from opening 20 of tubular body 12, to retain level L1 within internal cavity 16 of tubular body 12. Cap 14 is engaged with tubular body 12 by positioning cap 14 so as to be in alignment with tubular body 12, and is then axially moved toward opening 20 of tubular body 12 so that connector section 40 is received within cap opening 54. Such axial movement of cap 14 causes slight inward deflection of the walls of connector section 40 that include protrusions 44, to enable protrusions 44 to be received into openings 74 in side walls 56 as cap 14 is advanced on connector section 40. Peripheral edge 72 of cap 14 engages shoulder 42 to stop advancement of cap 14, and each protrusion 44 defines a shoulder that engages an edge of opening 74 to maintain cap 14 in engagement with tubular body 12. In order to remove cap 14, the user applies an inward force to the walls of connector section 40 at recesses 46 to disengage protrusions 44 from openings 74, and the user than applies an axial outward force to cap 14 so as to pull cap 14 off connector section 40 and to thereby expose the end of the level to enable the level to be withdrawn from internal cavity 16 of tubular body 12.

When cap 14 is engaged with tubular body 12 to close opening 20, the outer end of level L1 is located in close proximity to cap end wall 52, so as to prevent axial movement of level L1 within internal cavities 16 and 50 defined by tubular body 12 and cap 14, respectively. Cap indentations 60 function similarly to tubular body indentations 28, to receive the corners of level L1. The areas of internal cavity 50 between the level surfaces and the inside surfaces of cap side walls 56 and 58 forms an air space that protects the surfaces of level L1 against any forces that might be experienced by side walls 56 and 58 and that may cause inward deformation of side walls 56 or 58.

Figure 4:
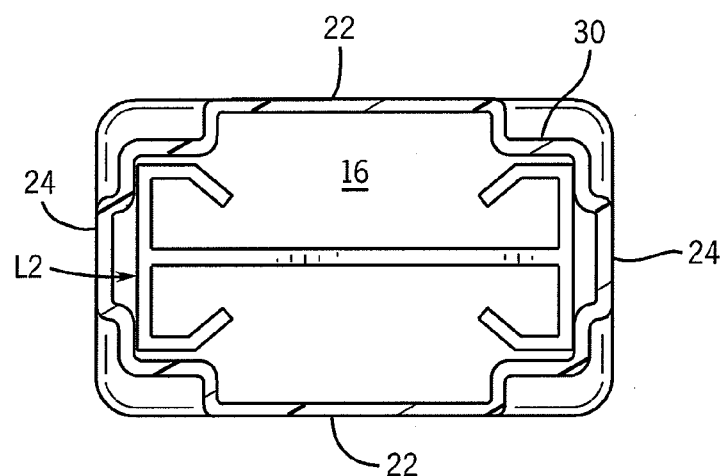
FIG. 4 is a view similar to FIG. 3, showing a level having a generally I-shaped cross section received within the internal cavity of the tubular body.
Figure 5:
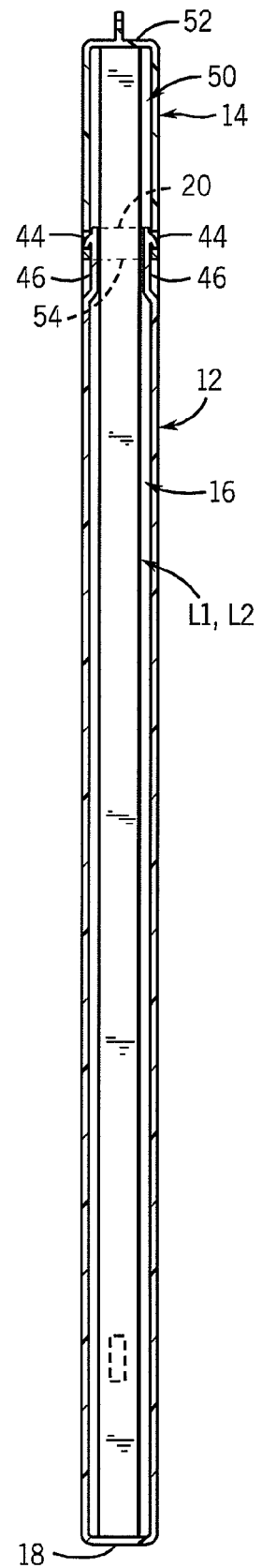
FIG. 5 is a longitudinal section view taken generally along line 5—5 of FIG. 1, and illustrating a level contained within the interior of the level case.

Referring to FIG. 4, a level such as L2 is received within internal cavities 16 and 50 of tubular body 12 and cap 14, respectively, in the same manner as explained with respect to level L1. Level L2 has a width slightly less than that of level L1, which provides a slight amount of clearance between the inner surfaces of indentation first walls 30 and the facing surfaces defined by the flanges of level L2. The height of level L2 is such that the upper and lower surfaces of the flanges of level L2 are located closely adjacent the inside surfaces of indentation second walls 32.

With the configuration of indentations 28 as shown and described, levels having different frame configurations can be encased within level case 12 and securely maintained in position so as to protect the level surfaces during storage or transport.

While the invention has been shown and described with respect to a specific embodiment, it is understood that various alternatives and modifications are possible and are contemplated as being within the scope of the present invention. For example, and without limitation, the indentations in the body and the cap may be formed at intermittent locations along the length of the body and the cap, rather than being formed continuously as shown and described, as discussed previously. The indentations need only be located so as to engage the corners of the level at spaced apart locations that are sufficient to maintain the level in position within the internal cavities of the tubular body and the cap. In addition, the specific configuration of the indentations may vary from that shown and described, so long as the indentations are formed so as to be capable of receiving the corners of the level when the level is received within the internal cavities of the tubular body and the cap. Further, the configuration of the walls between the indentations may vary from the straight-sided configuration as shown and described. For example, the walls may have a concave, outward curvature between the indentations or any other satisfactory configuration. Further, the tubular body may be formed to have a length that is equal to or greater than the length of the level. In a configuration such as this, the cap need only take the form of a member that closes the open end of the tubular body, without the need for structure that engages the corners of the level as shown and described. While the tubular body and the cap are shown and described as having an indentation for each corner of the level, it is also contemplated that the body and/or cap may be formed with two indentations configured to receive opposite corners of the level. In a configuration such as this, the indentations are configured to engage the level corners and adjacent surfaces in such a manner as to maintain the level in a desired position within the interior of the body and cap. In addition, while the invention has been shown and described as being used to encase a level, it is understood that the invention may also be employed to encase any type of elongated tool or other object having a series of corners.

Various alternatives and embodiments are contemplated as being within the scope of the following claims particularly pointing out and distinctly claiming the subject matter regarded as the invention.

We claim:

1. In combination, an elongated tool defining a series of corners, and a case for containing the elongated tool when not in use, wherein the case includes a tubular body having an internal cavity defined by a series of walls, and at least a pair of opposed elongated indentations constructed at least in part from the walls, wherein the opposed indentations are configured to receive at least a pair of opposite corners defined by the elongated tool, wherein the walls and the opposed indentations are configured to maintain the elongated tool in a position within the internal cavity of the tubular body by engagement with the indentations, and such that the walls of the tubular body are spaced outwardly of the surfaces of the tool between the opposite corners that are engaged with the indentations.

2. The combination of claim 1, wherein the elongated tool is a level.

3. The combination of claim 2, wherein the level defines four corners, and wherein the tubular body includes four indentations, each of which is configured to receive and engage one of the corners of the level.

4. The combination of claim 3, wherein the indentations of the tubular body are configured to receive and engage the corners of a first level having a rectangular cross section and the corners of a second level having a generally I-shaped cross section.

5. The combination of claim 2, further comprising a closure member configured to enclose the internal cavity of the tubular body to maintain the level within the internal cavity of the tubular body.

6. The combination of claim 5, wherein the tubular body defines a length less than that of the level so that a portion of the level extends outwardly of the internal cavity of the tubular body when the level is received within the internal cavity, and wherein the closure member defines an internal cavity configured to receive the portion of the level that extends outwardly of the internal cavity of the tubular body.

7. The combination of claim 6, wherein the closure member includes indentations that are configured to receive and engage at least a pair of opposed corners defined by the level.

8. In combination, a level defining a series of corners, and a case for containing the level when not in use, wherein the case includes a tubular body having an internal cavity defined by a series of walls, and at least a pair of opposed indentations that are configured to receive at least a pair of opposite corners defined by the level, wherein the opposed indentations are configured to maintain the level in a position within the internal cavity of the tubular body wherein the surfaces of the tool between the opposite corners are located inwardly of the walls of the tubular body, wherein the tubular body defines a length, and wherein the indentations extend continuously throughout a majority of the length of the tubular body.

9. A method of containing an elongated tool when the tool is not in use, wherein the tool defines a series of corners, comprising the steps of placing the tool into a tubular member having a series of walls that define an internal cavity, and engaging at least a pair of opposed corners of the tool to maintain the tool in a position within the internal cavity in which the tool is spaced inwardly from the walls of the tubular member, wherein the step of engaging the pair of opposed corners of the tool is carried out by engaging the opposed corners of the tool with a pair of elongated indentations constructed at least in part from the walls of the tubular member, wherein the opposed indentations are configured to maintain the elongated tool in a position within the internal cavity of the tubular body by engagement with the indentations, and wherein the walls and the indentations are further configured such that the walls of the tubular body are spaced outwardly of the surfaces of the tool between the opposite corners that are engaged with the indentations.

10. The method of claim 9, wherein the elongated tool comprises a level, and further including the step of placing a first level having a first cross-sectional configuration into a tubular member or placing a second level having a second cross-sectional configuration into a tubular member, wherein the indentations are configured to receive and engage opposed corners defined by either the first level or the second level.

11. The method of claim 9, further comprising the step of enclosing the tubular member to maintain the elongated tool within the internal cavity of the tubular member.

12. The method of claim 11, wherein the step of enclosing the tubular member is carried out by engaging a closure member with the tubular member.

13. The method of claim 12, wherein the step of placing the tool into the tubular member is carried out so that a portion of the tool extends outwardly of the internal cavity of the tubular member, and wherein the step of engaging a closure member with the tubular member is carried out by positioning the outwardly extending portion of the tool within an internal cavity defined by the closure member.

14. The method of claim 13, wherein the closure member includes a series of walls that define an internal cavity within which the outwardly extending portion of the tool is received, and further comprising the step of engaging at least a pair of opposed corners of the tool with indentations defined by the closure member to maintain the surfaces of the outwardly extending portion of the level inwardly of the walls of the closure member.

15. In a level case including a tubular body having a series of walls that define an internal cavity, and a closure member configured to engage the tubular body for selectively enclosing the internal cavity, wherein the level includes a series of corners, the improvement comprising at least a pair of elongated inwardly extending engagement indentations constructed at least in part from the walls of the tubular body, wherein the engagement indentations are configured to receive and engage at least a pair of opposed corners of the level without engaging areas of the level between the opposed corners, wherein the engagement structure is configured to maintain the level inwardly of the walls of the tubular member, wherein the engagement indentations are configured to receive at least a pair of corners defined by the elongated tool, wherein the walls and the engagement indentations are configured to maintain the elongated tool in a position within the internal cavity of the tubular body by engagement with the indentations, and such that the walls of the tubular body are spaced outwardly of the surfaces of the tool between the corners that are engaged with the indentations.

16. The improvement of claim 15, wherein the engagement structure extends in an axial direction on the tubular body.

17. The improvement of claim 16, wherein the indentations extend axially and continuously throughout a majority of the length of the tubular body.

* * * * *